Figure 1:
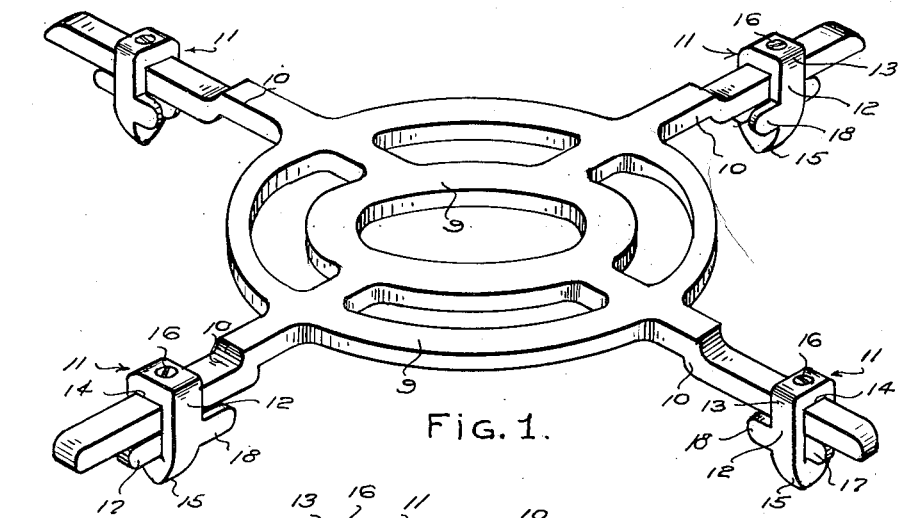

Oct. 2, 1956     A. D. CARANI     2,764,970
ADAPTER FOR STOVE BURNER GRILLS
Filed Aug. 18, 1952

INVENTOR.
ATTILIO D. CARANI,
BY
ATTORNEY.

United States Patent Office 2,764,970
Patented Oct. 2, 1956

2,764,970

ADAPTER FOR STOVE BURNER GRILLS

Attilio D. Carani, Miami, Fla.

Application August 18, 1952, Serial No. 304,924

1 Claim. (Cl. 126—214)

This invention relates to stove burner grills and has particular reference to a novel form of grill that is constructed as a universal replacement for any one of a great variety of grills now in use.

As will be readily apparent to persons familiar with stoves and particularly gas stoves, each manufacturer has created his own grill for a particular model of stove, whereby the grill of one manufacturer will rarely fit a stove opening of another manufacturer and, frequently an individual manufacturer will produce a number of different models of stoves, each having their particular grill that fits no other stove, with the grills seldom being interchangeable. Thus a dealer in stoves is required to carry an unnecessarily large stock of grills of assorted sizes and makes and especially the dealer who handles only one or a few makes of stoves is unable in a great majority of cases to replace a specific size of grill, thus working a hardship on the general public and the dealer likewise since the dealer must order the particular grill from the manufacturer on the assumption that the particular stove is still being built, or he must carry an unusually large assortment of grills in order to render a service to the customer without a considerable delay, and this means that his investment in replacement grills is relatively large for a stock item that is so slow moving.

It is the prime object of the present invention to provide a burner grill that is adjustable in a manner to make it practically universal to the major number of well known stoves in use and, by the use of such a device, the investment by the dealer in stove grills is considerably reduced, enabling the public to receive a prompt replacement.

The device of the present invention contemplates a grill of conventional design, the radial legs of which are of a length to span the great majority of burner openings, and with each leg having an adjustable adapter for accurately locating and maintaining the adapter grill with respect to the particular burner opening and with either the recess or lug of the conventional opening cooperating with the adapter to accurately position the grill over the opening against shifting horizontally or around the burner while in use.

Novel features of construction and operation will be more readily understood by reference to the accompanying descriptive matter, coupled with the illustration of the device.

Figure 2:
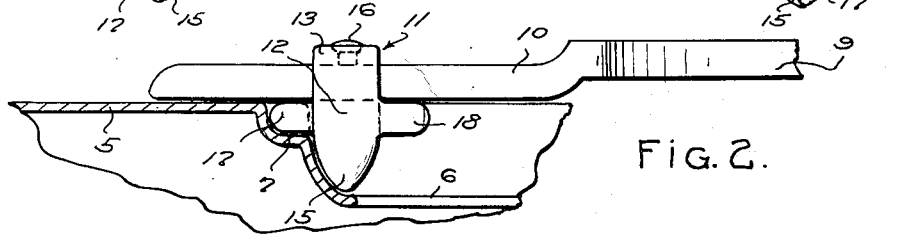
Figure 3:
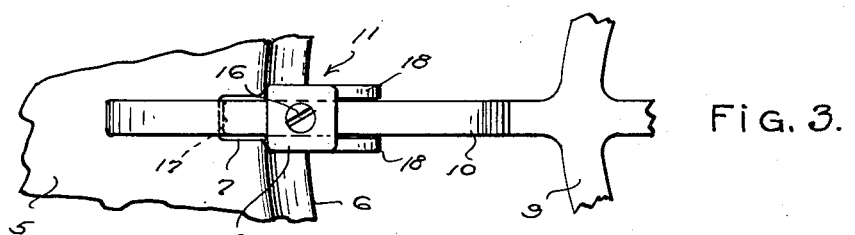
Figure 4:
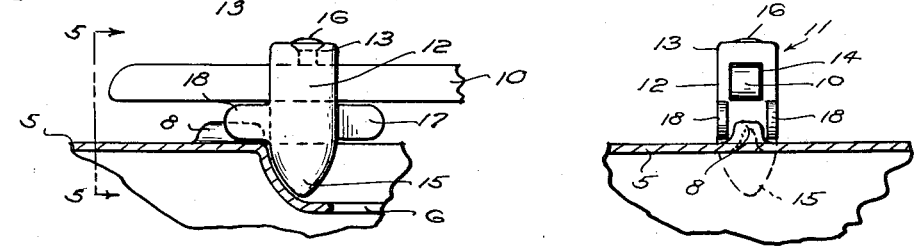
Figure 5:
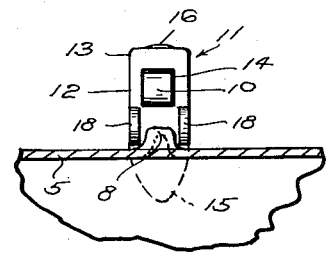
Figure 6:
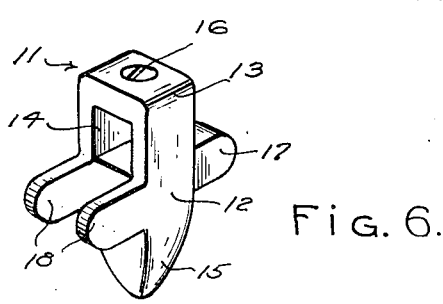

In the drawings, wherein has been illustrated a preferred form of the invention and wherein like characters of reference are employed to denote like parts throughout:

Figure 1 is a perspective view of a stove burner grill, showing the invention applied thereto, Figure 2 is a fragmentary side elevation of one radial grill leg with the adapter of this invention applied thereto and as seating upon the burner opening, Figure 3 is a top plan view of the device as in Figure 2, Figure 4 is a view similar to Figure 2, with the adapter being reversed to accommodate the grill to a modified form of stove top, Figure 5 is a section taken substantially on line 5—5 of Figure 4 and, Figure 6 is a perspective view of one adapter.

Referring specifically to the drawings, the numeral 5 designates a stove top, provided with the usual burner opening 6. In the form of the stove illustrated in Figure 2, the top is provided with spaced recesses 7, provided to accurately space a grill that has been manufactured for the particular stove, while in Figures 4 and 5, the stove top has been provided with raised lugs that serve a similar purpose, as indicated at 8.

The grill of the present invention may be formed of any desirable design and, for purposes of illustration, has here been shown as embodying concentric, spaced apart and integral rings 9, with the outermost ring provided with radially disposed and equidistantly spaced legs 10, usually square in cross-section. The grill as manufactured, has given consideration to the major known stoves and the diameter of the largest known opening and the legs 10 have been formed of a length to overlie the opening of greatest diameter with their ends resting upon the stove stop. The device of this invention is obviously a replacement grill to take the place of grills that have been broken and difficult to replace.

Each of the legs 10 is equipped with a shiftable adapter, indicated as a whole, by the numeral 11 and shown more clearly in Figure 6. Each adapter 11 comprises a body portion 12, having a preferably square head 13, that is provided with a square opening 14 therethrough, of a size to slidably receive a leg 10. The body portion 12 tapers downwardly at 15 to form an abutment that acts as a stop to determine the extent of outward adjustment of the adapter. A set screw 16 serves to fix the adapter upon the leg 10 after adjustment. The several adapters are identical in construction and are reversible upon the legs 10, as will now be described.

Each adapter is provided with a centrally disposed lug 17 that is normally in alignment with the legs 10 and underlies the legs in either position of adjustment of the adapter. The adapters are further provided with oppositely extending and spaced apart wings 18, preferably flush with the opposite sides of the adapter and spaced apart a distance substantially equal to the thickness of the leg 10. The lug 17, as clearly shown in Figures 2 and 3, has a seating within the recess 7 of the stove top and serves to maintain the grill against shifting or rotating upon the stove top. The recesses are standard constructions on well known stoves. The wings 18 serve a purpose similar to the lug 17 that is, to accurately position the grill upon the stove top and to prevent shifting or rotating movement of the grill when in use. The wings 18 straddle the usual upstanding lugs 8 of the stove top.

In the use of the device, the operator loosens the several set screws 16, places the grill over the burner opening in as nearly a centered position as possible, then slides the adapters outwardly until their abutment ends 15 strike the inner circumference of the burner opening. The several set screws 16 are then set tight and the grill is positively held against shifting laterally. When the stove top is provided with the recesses 7, the lugs 17 are positioned outwardly so as to readily seat within the recess when the adapters are adjusted. Thus, the grill is held against turning movement. Should the stove be equipped with the raised lugs 8, the adapters are removed from the legs 10, reversed and replaced, with the wings 18 being then outwardly directed. The adapters are then adjusted to the point where the abutment contacts the inner circumference of the burner opening, with the pairs of wings 18 straddled upon the lugs 8.

It will be apparent from the foregoing, that a very simple and most desirable adapter replacement grill has been provided. The device is simple, extremely cheap to manufacture, is strong, durable, simple to adjust to a particular burner opening and will effectively replace any of a great number of conventional grills now in use or discontinued.

While a specific form of the device has been illustrated and described, changes are contemplated as readily fall within the spirit of the invention or the scope of the subjoined claim.

Having described my invention, what I claim as new and desire to secure by letters patent is:

An adjustable adapter grill for use with a gas stove of the type that has a top provided with burner openings and adjacent stop means to prevent rotation of a grill, the stove top circumferentially of the openings being provided with stop means, an open burner grill provided with equidistantly spaced radial legs, the legs having a length to span the burner opening and overlie an area of the stove stop immediately surrounding the burner opening, adapters shiftably positioned upon each of the legs, each of the adapters having an abutment that contacts an annular wall of the burner opening when the adapters are adjusted outwardly upon the legs to center the grill with respect to the burner opening, the adapters apertured for slidably receiving the legs of the grill, each of the adapters provided with an integral lug that has engagement with the stop means of the stove and set screws for securing the several adapters in adjusted position.

References Cited in the file of this patent

UNITED STATES PATENTS

| | | |
|---|---|---|
| 1,207,586 | Manz | Dec. 5, 1916 |
| 1,241,154 | Setecka | Sept. 25, 1917 |
| 1,480,585 | Wilkie | Jan. 15, 1924 |
| 1,991,135 | Brown | Feb. 12, 1935 |

FOREIGN PATENTS

| | | |
|---|---|---|
| 501,024 | Germany | Apr. 24, 1928 |